United States Patent
Freund et al.

(10) Patent No.: US 8,769,489 B2
(45) Date of Patent: Jul. 1, 2014

(54) METHOD FOR ENCAPSULATING COMPONENTS HIERARCHICALLY COMPOSED FUNCTIONS

(75) Inventors: Ulrich Freund, Stuttgart (DE); Nuria Mata Burgarolas, Neubiberg (DE); Alexander Burst, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 2052 days.

(21) Appl. No.: 11/666,834

(22) PCT Filed: Nov. 25, 2005

(86) PCT No.: PCT/EP2005/056230
§ 371 (c)(1),
(2), (4) Date: Feb. 1, 2011

(87) PCT Pub. No.: WO2006/056601
PCT Pub. Date: Jun. 1, 2006

(65) Prior Publication Data
US 2011/0119650 A1    May 19, 2011

(30) Foreign Application Priority Data

Nov. 26, 2004  (DE) .......................... 10 2004 057 263

(51) Int. Cl.
*G06F 9/44*    (2006.01)

(52) U.S. Cl.
USPC ............................ 717/107; 717/100; 717/106

(58) Field of Classification Search
USPC ........................................................ 717/107
See application file for complete search history.

(56) References Cited

U.S. PATENT DOCUMENTS

| | | |
|---|---|---|
| 2003/0023407 A1 | 1/2003 | Loehr et al. |
| 2003/0115037 A1 | 6/2003 | Sumida |
| 2004/0143801 A1 | 7/2004 | Waters et al. |

*Primary Examiner* — Don Wong
*Assistant Examiner* — Roberto E Luna
(74) *Attorney, Agent, or Firm* — Kenyon & Kenyon LLP

(57) ABSTRACT

A method is provided for operating a first computer device, in which a source program code is generated which contains a functional model that is hierarchically composed of functions which are hierarchically composed of components, the visibility of the components within the functional model being determined by the hierarchy. Placeholders are used within the hierarchy for determined components and executable program code is generated, the placeholders being replaced by the determined components via a correspondingly executed mapping rule before executable program code is generated. This method allows the locality principle to be maintained, for example on experimental hardware.

10 Claims, 4 Drawing Sheets

METHOD FOR ENCAPSULATING COMPONENTS HIERARCHICALLY COMPOSED FUNCTIONS

FIELD OF THE INVENTION

The present invention relates to a method for operating a computer device as recited in the preamble of Claim 1, a corresponding computer program, and a computer program product.

BACKGROUND INFORMATION

In the following description, reference is essentially made to motor vehicle regulation and control algorithms without limiting the method according to the present invention to this application.

Functional models of motor vehicle regulation and/or control algorithms are generally hierarchically structured. Components are combined into functions in a stepwise manner during the development or modeling. A component limits outside access to internal data or signals by providing explicit interfaces. In addition, access to the interfaces of other components is explicitly specified by an interface description. A hierarchy composed of multiple functions may encompass the entire vehicle. A function contains a hierarchy composed of components.

The exchange of signals or data between components and functions likewise occurs via interfaces, or "ports." For components which are described in greater detail below, actuators which are able to influence the physical or material characteristics of their surroundings and sensors which are able to detect the characteristics of their surroundings are controlled via these ports.

To maintain the clarity of models constructed in this manner, the visibility of sensor and actuator communication is locally limited (locality principle). If a sensor or actuator signal is required by only one component, the visibility of the signal is limited to this component.

A component which encapsulates a locally visible sensor or actuator signal is referred to as a sensor or actuator component. Other components are usually referred to as leaf components. Function-wide sensor or actuator signals are visible only within a function, whereas vehicle-wide sensor or actuator signals are visible on the highest hierarchical level of all functions.

The locality principle is implemented by locating the sensor or actuator components on the particular hierarchical level, and the placement of interfaces into the reading or writing components. The number of interfaces on the function and vehicle levels is significantly reduced via this procedure, and functional encapsulation of the sensor and actuator components is achieved.

This locality principle is violated when, according to the aforementioned rules, modeled functions are carried out on experimental hardware, for example rapid prototyping (RP) systems or electronic control units (ECU).

It is necessary to introduce into the model a set of sensor and actuator components which corresponds to the experimental hardware. The representation of these sensor and actuator components, referred to as platform software components, within the model depends on the actual characteristics of the experimental hardware, for example, the peripheral modules for microcontrollers of an ECU, or the input/output cards in RP systems.

These platform software components deliver the exact number of signals from the corresponding hardware module as inputs or outputs. For today's modeling tools, these components and therefore all inputs and outputs are defined on the highest hierarchical level and are therefore visible system-wide. This prevents local use of individual signals within the leaf components of a function hierarchy or component hierarchy.

As a result, unclear models are obtained which violate the locality principle described above.

SUMMARY OF THE INVENTION

In the method according to the present invention for operating a first computer device, a source program code is generated which contains a functional model that is hierarchically composed of functions which are hierarchically composed of components. The visibility of the components within the functional model is determined by the hierarchy, and placeholders are used within the hierarchy for determined components. An executable program code is generated, and the placeholders are replaced by the determined components via an appropriately executed mapping rule before executable program code is generated. The introduction of this mapping rule makes it possible to maintain the locality principle.

In the method according to the present invention, the executable program code is advantageously generated on a second computer device and is transferred to the first computer device. A conventional computer, for example, may be used as the second computer device.

The method according to the present invention is particularly preferred when sensor and/or actuator components are used as components, in particular as placeholders.

In one preferred embodiment of the method according to the present invention, the functional model represents a motor vehicle regulation and/or control algorithm. In particular in automotive engineering, the use of computer devices for implementing regulation and/or control algorithms which involves violation of the locality principle is frequently encountered. The advantageous use of the method according to the present invention provides improved clarity of the functional model.

In the method according to the present invention it is advantageous to use experimental hardware, in particular rapid prototyping systems or electronic control units, as the first computer device. This use enables the preferred maintenance of the locality principle in the generation of functional models for experimental hardware.

In the method according to the present invention it is particularly preferred for the mapping rule to be present in a list-type structure in which the components are associated with the placeholders.

It is also preferred if in the method according to the present invention the mapping rule is provided graphically where the components are associated with the placeholders.

These two specific embodiments of the mapping rule may be managed in a particularly simple manner.

The method according to the present invention is particularly preferred when the functional model for the source program code is generated from another functional model in which no placeholders are used within the hierarchy for determined components, and the mapping rule is generated. This allows the advantageous use of the method according to the present invention for models that have already been generated.

The computer program according to the present invention having program code means is designed to carry out and/or generate the mapping rule of the method according to the present invention when this computer program is executed on a computer or an appropriate computing unit.

The computer program product according to the present invention having program code means which are stored on a computer-readable data carrier is provided for carrying out and/or generating the mapping rule of the method according to the present invention when this computer program is carried out on a computer or an appropriate computing unit, in particular a device according to the present invention.

Further advantages and embodiments of the present invention result from the description and the accompanying drawing.

It is understood that the features described above and to be explained below may be used not only in the particular combination stated, but also in other combinations or alone without departing from the scope of the present invention.

DETAILED DESCRIPTION

Figure 1:
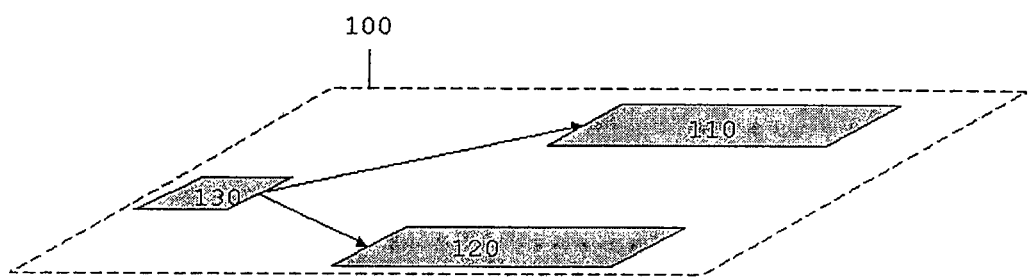
FIG. 1 shows a function of a functional model composed of two subfunctions, to which the method according to the present invention may be applied.

FIG. 1 shows a function designated overall by reference numeral 100. The highest hierarchical level of the function is illustrated. Function 100 has a first subfunction 110 and a second subfunction 120. The function also has a sensor component 130 which provides its sensor signal to both subfunctions 110 and 120.

Figure 2:
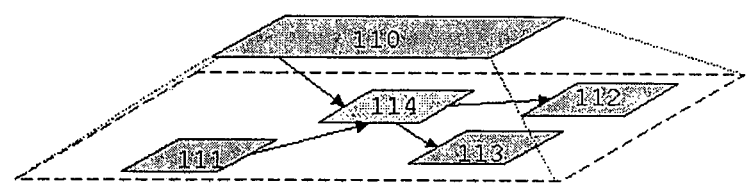
FIG. 2 shows the components of one of the subfunctions illustrated in FIG. 1.

FIG. 2 shows the hierarchy composed of components of subfunction 110. The highest hierarchical level is designated by reference numeral 110. Subfunction 110 has a local sensor component 111 and two local actuator components 112, 113. The subfunction also has a leaf component 114. Leaf component 114 is designed as a computation component which relates values from local sensor component 111 to signals from function-wide sensor component 130 and uses the computation results thereof to control local actuator components 112, 113.

Figure 3:
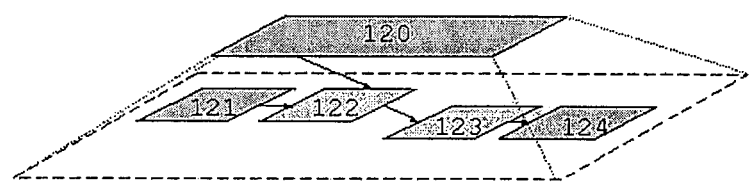
FIG. 3 shows the components of the other subfunction illustrated in FIG. 1.

FIG. 3 shows the hierarchy composed of components of subfunction 120. The highest hierarchical level is designated by reference numeral 120. Subfunction 120 has a local sensor component 121, two local leaf components 122, 123, and a local actuator component 124.

Leaf component 122 is designed as a computation component which relates values from local sensor component 121 to signals from function-wide sensor component 130 and delivers the computation results to next leaf component 123. Leaf component 123 also carries out computations, for example, and uses the results thereof to control local actuator component 124.

Figure 4:
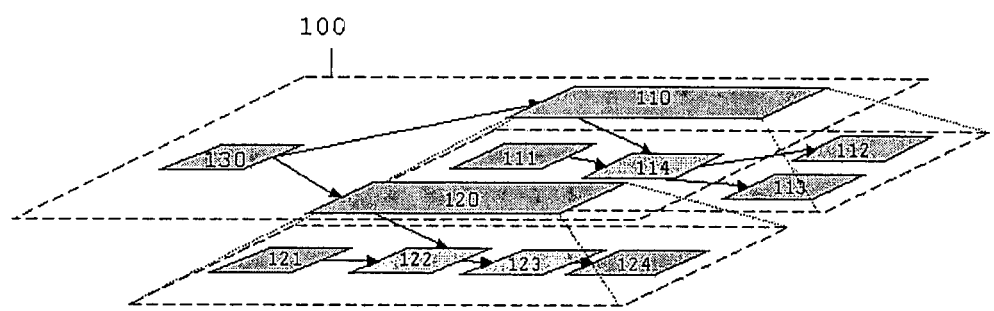
FIG. 4 shows the function and the subfunction within a functional model hierarchy.

FIG. 4 shows two hierarchical levels of function 100. Function 100 has first subfunction 110 and second subfunction 120. The function also has sensor component 130 which provides its sensor signal to both subfunctions 110 and 120.

Subfunction 110 has local sensor component 111, two local actuator components 112, 113, and leaf component 114 which relates the values from local sensor component 111 to signals from function-wide sensor component 130 and uses the computation results to control local actuator components 112, 113. Sensor component 111 and actuator components 112, 113 are functionally encapsulated within subfunction 110.

Subfunction 120 has local sensor component 121, two local leaf components 122, 123, and local actuator component 124.

Leaf component 122 relates the values from local sensor component 121 to signals from function-wide sensor component 130 and delivers the computation results to next leaf component 123, which also carries out computations, for example, and uses the results thereof to control local actuator component 124. Sensor component 121 and actuator component 124 are functionally encapsulated within subfunction 120.

FIGS. 1 through 4 show various views within the hierarchical levels which are possible for illustrated function 100 together with its subfunctions 110, 120.

Figure 5:
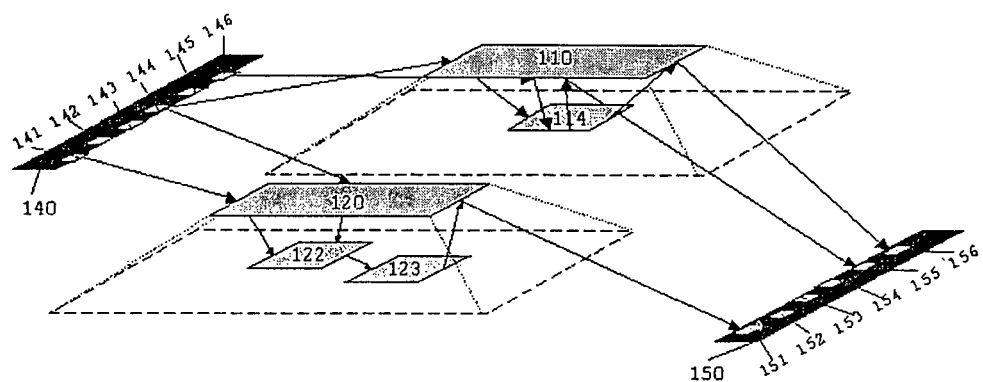
FIG. 5 shows the platform software components within the hierarchy.

FIG. 5 shows the mapping of function 100, equivalent to FIG. 4, after the introduction of platform software components, for example for experimental hardware. The introduction violates the locality principle, and the functional encapsulation of the sensor and actuator components is lost.

Function 100 in turn has subfunctions 110 and 120 together with their leaf components 122, 123, and 114. Input platform software component 140 and output platform software component 150 are illustrated adjacent thereto. Input platform software component 140 has a number of channel components 141 through 146 which correspond to the physical characteristics of the associated experimental hardware. Likewise, output platform software component 150 has a number of channel components 151 through 156 which correspond to the physical characteristics of the associated experimental hardware. Channel components, i.e., channels, 142, 143, 145, 152, 153, 154 are not occupied or connected.

In this platform-oriented view, all connections between channel and leaf components are globally visible. Sensor components 130, 111, and 121, present in the previous views in FIGS. 1 through 4, have been replaced by channels 144, 146, and 141 of input platform software component 140; namely, 130 has been replaced by 144, 111 by 146, and 121 by 141.

Likewise, actuator components 124, 113, and 112 have been replaced by channels 151, 155, and 156 of output platform software component 150; namely, 124 has been replaced by 151, 113 by 155, and 112 by 156.

In this illustration the connections from the channels to the leaf components, discernible for example in the connection of channel 144 to leaf components 110 and 130, run separately (unbundled). It is also possible to run the connection jointly (bundled). This is possible when the connected leaf components are present on one hierarchical level. In one such case (not shown), the connection runs jointly from the channel to the hierarchical level, and is not split (unbundled) until it reaches the hierarchical level. It is understood that this channel bundling and separation may be used for the connections of leaf components for both the input and the output platform software components.

Figure 6:
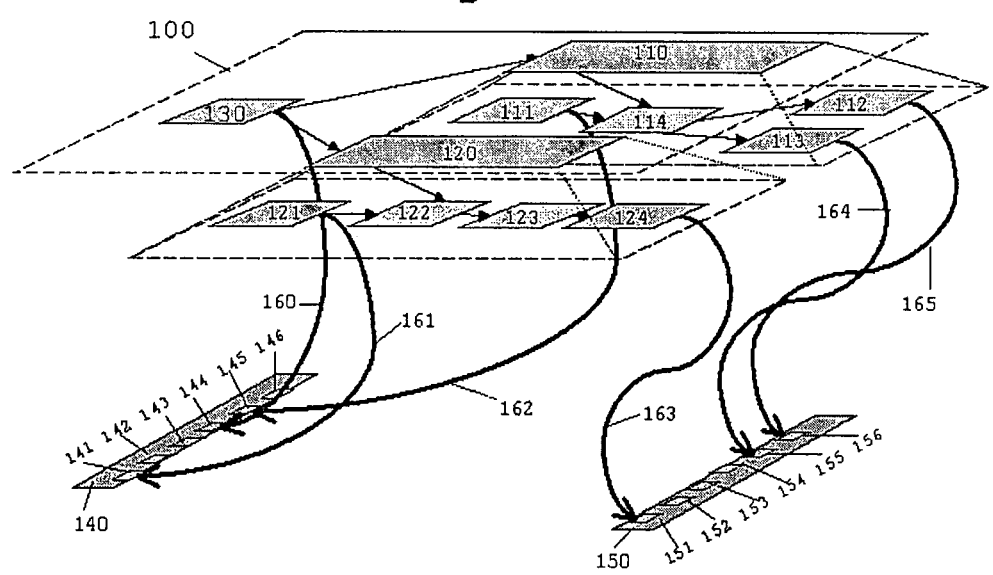
FIG. 6 shows the graphic representation of a mapping rule.

FIG. 6 shows the mapping of function 100, equivalent to FIG. 4, after the introduction of platform software components, for example for experimental hardware, according to one preferred specific embodiment of the method according to the present invention.

Function 100 has the two subfunctions 110, 120 and sensor component 130, which provides its sensor signal to both subfunctions 110 and 120.

Subfunction 110 has local sensor component 111, two local actuator components 112, 113, and leaf component 114. Sensor component 111 and actuator components 112, 113 are functionally encapsulated within subfunction 110.

Subfunction 120 has local sensor component 121, two local leaf components 122, 123, and local actuator component 124. Sensor component 121 and actuator component 124 are functionally encapsulated within subfunction 120.

Also illustrated are input platform software component 140 having channels 141 through 146, and output platform software component 150 having channels 151 through 156. The number of channels corresponds to the physical characteristics of the associated experimental hardware. Channels 142, 143, 145, 152, 153, 154 are not occupied or connected.

The mapping rule for one preferred specific embodiment of the method according to the present invention is graphically represented via black arrows 160 through 165. Mapping arrows 160 through 165 together with platform software components 140 and 150 are not visible during the modeling phase.

In the conventional method a model is generated according to FIG. 5 in the modeling phase, for experimental hardware, for example. In one preferred embodiment of the method according to the present invention, a model may instead be generated according to FIG. 4 or FIG. 6, in which local sensor and actuator components 130, 121, 124, 111, 112, 113 are used as placeholders for channel components 141 through 146 and 151 through 156 of platform software components 140 and 150.

According to one preferred specific embodiment of the method according to the present invention, the mapping rule is present in FIG. 6 as graphic representation 160 through 165.

It is also preferred to generate a model containing placeholders according to FIG. 4 or FIG. 6 from a hierarchical model already present in the platform view according to FIG. 5.

Figure 7:
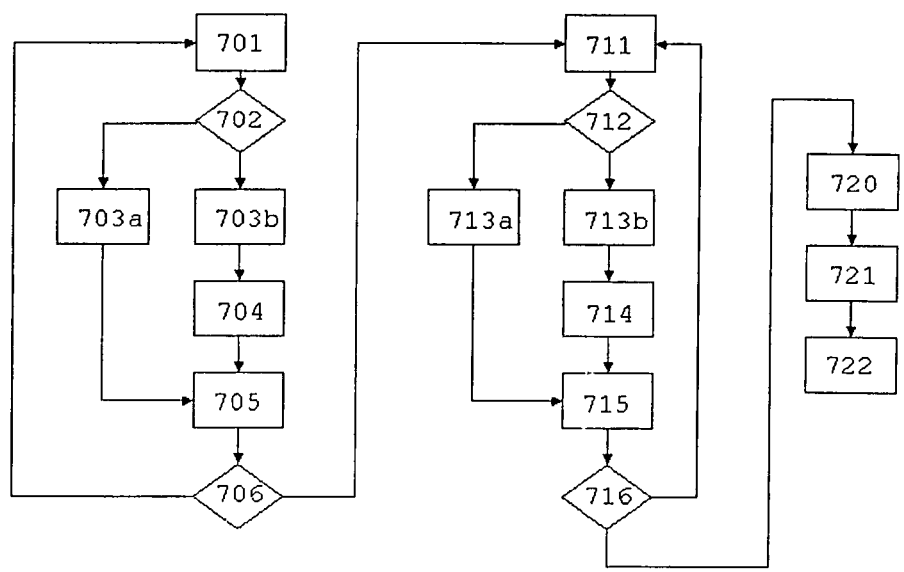
FIG. 7 shows a schematic illustration of one preferred specific embodiment of the method according to the present invention.

One preferred embodiment of the method according to the present invention is illustrated in FIG. 7. The following method steps are carried out, based on a model in the platform view.

In step 701, starting from a channel component of the input software component, a connection is followed via each connected hierarchical component until a leaf component or a channel separation is reached.

In step 702 a determination is made as to how many components and channel separations are connected to the channel. If the channel is connected to exactly one component or channel separation, step 703a follows. If the channel is connected to more than one component and/or channel separation, step 703b follows.

In step 703a the connection of the channel to the component or channel separation is broken, and a local sensor component is generated as a placeholder on the hierarchical level of the leaf function which contains the component or channel separation, and is connected to the leaf components that were originally connected directly to the channel or the channel separation. The channel separation is removed.

In step 703b a search is made for any additional component or channel separation which is connected to the channel and which determines the hierarchical level of the additional component or channel separation. In step 704 a local sensor component is applied as a placeholder on the highest common hierarchical level, and is connected to the leaf components and/or hierarchically subordinate channel separations. Channel separations on the highest hierarchical level are removed. The connection of the channel to the leaf components and/or channel separations is interrupted.

In step 705, for each sensor component generated in 703a or 704 an entry is generated in, for example, a list-type structure which associates the name or identifier of the added local sensor component (placeholder) with the corresponding channel component of the input platform software component.

In step 706 the next channel of the input platform software components connected to leaf components is determined, and the procedure continues with step 701. Step 711 follows if there is no additional connected channel.

In step 711, starting from a channel component of the output software component, a connection is followed via each connected hierarchical component until a leaf component or a channel separation is reached.

In step 712 a determination is made as to how many components and channel separations are connected to the channel. If the channel is connected to exactly one component or channel separation, step 713a follows. If the channel is connected to more than one component and/or channel separation, step 713b follows.

In step 713a the connection of the channel to the component or channel separation is broken, and a local actuator component is generated as a placeholder on the hierarchical level of the leaf function which contains the component or channel separation, and is connected to the leaf components that were originally connected directly to the channel or the channel separation. The channel separation is removed.

In step 713b a search is made for any additional component or channel separation which is connected to the channel and which determines the hierarchical level of the additional component or channel separation. In step 714 a local actuator component is applied as a placeholder on the highest common hierarchical level, and is connected to the leaf components and/or hierarchically subordinate channel separations. Channel separations on the highest hierarchical level are removed. The connection of the channel to the leaf components and/or channel separations is interrupted.

In step 715, for each actuator component generated in 713a or 714 an entry is generated in the list-type structure which associates the name or identifier of the added local actuator component (placeholder) with the corresponding channel of the output platform software component.

In step 716 the next channel of the input platform software component connected to leaf components is determined, and the procedure continues with step 711. Step 720 follows if there is no additional connected channel.

In step 720 the placeholders are replaced by the platform software components or the channels thereof, using the generated mapping rule according to the list-type structure, and executable program code is generated.

In step 721, the executable program code according to one preferred specific embodiment of the method according to the present invention is transferred to the computer device, which advantageously is experimental hardware.

In step 722 the computer device is operated using the transferred executable program code.

What is claimed is:

1. A method for operating a first computer device, comprising: generating a source program code which contains a functional model which is hierarchically composed of functions which are hierarchically composed of components; tracking, from a channel of an input software component, a connection via each of the hierarchically connected components until one of a leaf component and a channel separation is reached; determining how many components and channel separations are connected to the channel of the input software component; and executing an algorithm that provides that: the following is performed responsive to a result of the determining being one: breaking the connection of the channel to the single component or channel separation; generating a local component as a placeholder at a hierarchical level of the functions that includes the single component or channel separation; connecting the placeholder to the channel; and removing the single component or channel separation; and the following is performed responsive to the result of the determining being greater than one: searching for one of additional components and additional channel separations; determining hierarchical levels of the additional components and additional channel separations; generating the local component as a placeholder at a highest hierarchical level; connecting the placeholder to one of leaf components and hierarchically subordinate channel separations; and removing channel separations at the highest hierarchical level; wherein the placeholder is replaced by the single component or channel separation via an appropriately executed mapping rule before executable program code is generated.

2. The method as recited in claim 1, wherein the executable program code is generated on a second computer device and is transferred to the first computer device.

3. The method as recited in claim 1, wherein sensor and/or actuator components are used as components corresponding to placeholders.

4. The method as recited in claim 1, wherein the functional model represents a motor vehicle regulation and/or control algorithm.

5. The method as recited in claim 1, wherein experimental hardware corresponding to rapid prototyping systems or electronic control units is used as the first computer device.

6. The method as recited in claim 1, wherein the mapping rule is present in a list-type structure in which the components are associated with the placeholders.

7. The method as recited in claim 1, wherein the mapping rule is present as a graphic representation in which the components are associated with the placeholders.

8. The method as recited in claim 1, wherein the functional model for the source program code is generated from another functional model in which no placeholders are used within the hierarchy for determined components, and the mapping rule is generated.

9. The method as recited in claim 1, wherein the method is performed via a computer program having program code executed on a computer.

10. The method as recited in claim 1, wherein the method is performed via a computer program product having program code stored on a computer-readable data carrier, and the computer program product is executed on a computer.

* * * * *